United States Patent
Li et al.

(10) Patent No.: US 12,465,471 B2
(45) Date of Patent: Nov. 11, 2025

(54) MULTI-LAYER PORCELAIN BLOCK, PREPARATION METHOD THEREOF AND DENTURE

(71) Applicant: SHENZHEN YURUCHENG DENTAL MATERIALS CO., LTD., Shenzhen (CN)

(72) Inventors: Zongyu Li, Shenzhen (CN); Yu Zhang, Shenzhen (CN); Jianjun Liu, Shenzhen (CN); Wei Liu, Shenzhen (CN)

(73) Assignee: SHENZHEN YURUCHENG DENTAL MATERIALS CO., LTD., Shenzhen (CN)

( * ) Notice: Subject to any disclaimer, the term of this patent is extended or adjusted under 35 U.S.C. 154(b) by 0 days.

(21) Appl. No.: 18/364,622

(22) Filed: Aug. 3, 2023

(65) Prior Publication Data
US 2024/0050204 A1 Feb. 15, 2024

(30) Foreign Application Priority Data
Aug. 10, 2022 (CN) .......................... 202210959135.5

(51) Int. Cl.
A61C 13/00 (2006.01)
A61C 13/01 (2006.01)
(Continued)

(52) U.S. Cl.
CPC .......... *A61C 13/0022* (2013.01); *A61C 13/01* (2013.01); *A61C 13/083* (2013.01);
(Continued)

(58) Field of Classification Search
CPC . A61C 13/0022; A61C 13/01; C04B 35/4885; C04B 35/64
(Continued)

(56) References Cited

U.S. PATENT DOCUMENTS

2016/0228222 A1* 8/2016 Rolf .................. A61C 13/09
2023/0338123 A1* 10/2023 Jahns ................ C04B 38/0058
2024/0034684 A1* 2/2024 Kato .................. C01G 25/02

FOREIGN PATENT DOCUMENTS

CN 109771064 A 5/2019
CN 110317059 A 10/2019
(Continued)

OTHER PUBLICATIONS

First Office Action issued in counterpart Chinese Patent Application No. 202210959135.5, dated Dec. 5, 2022.
(Continued)

*Primary Examiner* — Katherine A Christy
(74) *Attorney, Agent, or Firm* — Westbridge IP LLC

(57) ABSTRACT

A multi-layer porcelain block includes a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer laid in sequence. The zirconia powders in the first to eighth zirconia powder layers are doped with yttria. The first zirconia powder layer accounts for 13% to 17% by mass, the second zirconia powder layer accounts for 8% to 12% by mass, the third zirconia powder layer accounts for 10% to 14% by mass, the fourth zirconia powder layer accounts for 10% to 14% by mass, the fifth zirconia powder layer accounts for 10% to 14% by mass, the sixth zirconia powder layer accounts for 10% to 14% by mass.

2 Claims, 1 Drawing Sheet

(51) Int. Cl.
  *A61C 13/083* (2006.01)
  *C04B 35/488* (2006.01)
  *C04B 35/64* (2006.01)

(52) U.S. Cl.
  CPC .......... C04B 35/4885 (2013.01); C04B 35/64 (2013.01); *C04B 2235/3217* (2013.01); *C04B 2235/3224* (2013.01); *C04B 2235/3246* (2013.01); *C04B 2235/3265* (2013.01); *C04B 2235/3272* (2013.01); *C04B 2235/604* (2013.01); *C04B 2235/6562* (2013.01); *C04B 2235/75* (2013.01); *C04B 2235/9661* (2013.01)

(58) Field of Classification Search
  USPC .......................................................... 428/697
  See application file for complete search history.

(56) References Cited

FOREIGN PATENT DOCUMENTS

| EP | 4458318 A1 | * | 11/2024 | ........... A61C 13/083 |
| WO | 2022074494 A1 | | 4/2022 | |
| WO | WO-2023127945 A1 | * | 7/2023 | ........... A61C 13/083 |

OTHER PUBLICATIONS

Refusal Decision issued in counterpart Chinese Patent Application No. 202210959135.5, dated May 20, 2023.
Styles, Catalyst Carrier and Supported Catalyst, 1992, p. 71, China Petrochemical Press, Beijing, dated Mar. 31, 1992.
Tan, Chinese Medical Clinic Hundred, 2020, pp. 35-37, Scientific and Technical Literature Press, Beijing, dated Aug. 31, 2020
Zhang et al., Clinical stomatology, 2014, p. 104, Science and Technical Literature Press, Beijing, dated Jul. 31, 2014.
European Search Report issued in counterpart European Patent Application No. EP 23189374.4, dated Jan. 15, 2024.

* cited by examiner

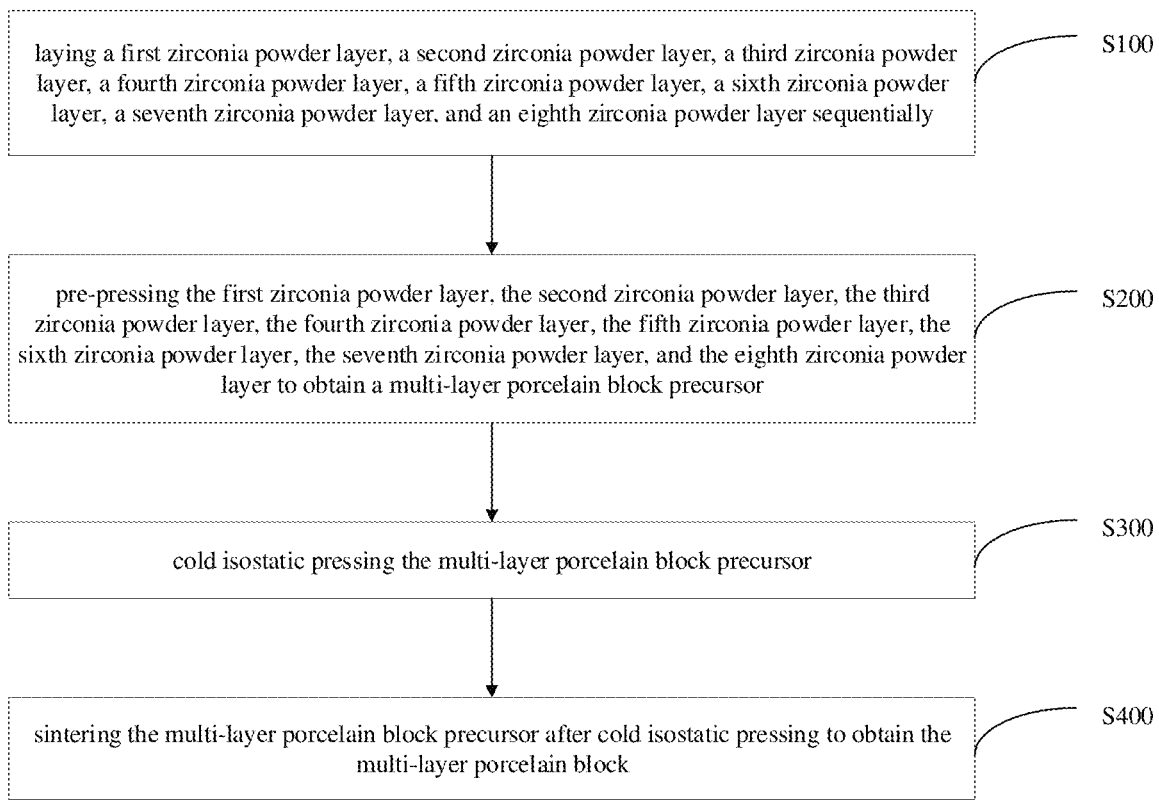

MULTI-LAYER PORCELAIN BLOCK, PREPARATION METHOD THEREOF AND DENTURE

CROSS-REFERENCE TO RELATED APPLICATIONS

This application claims priority to Chinese Patent Application No. 202210959135.5, filed on Aug. 10, 2022, the entire contents of which are incorporated herein by reference.

TECHNICAL FIELD

The present application relates to the technical field of denture material, in particular to a multi-layer porcelain block, a preparation method thereof and a denture.

BACKGROUND

Dentures, commonly referred to as "false teeth", are a general term in medicine for the prosthetic restorations made to replace partially or completely missing teeth in the upper and lower jaws. Dentures are categorized into two types: removable and fixed. Fixed dentures cannot be removed and worn by the patient themselves, while removable dentures can be easily taken in and out by the patient.

Dentures are made from various materials, and those made from porcelain blocks are called porcelain teeth. Currently, the average flexural strength of multi-layer porcelain block products used for making porcelain teeth in the market is approximately 720 MPa. They are only suitable for fabricating short bridges within three units or single teeth. There is a risk of fracture and insufficient strength when making long bridges or half teeth.

SUMMARY

The main objective of the present application is to provide a multi-layer porcelain block, a preparation method thereof and a denture. The multi-layer porcelain block has a high strength to be suitable for making long bridges or half teeth.

The present application provides a multi-layer porcelain block, including a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer laid in sequence.

The zirconia powders in the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer are doped with yttria.

The first zirconia powder layer accounts for 13% to 17% by mass, the second zirconia powder layer accounts for 8% to 12% by mass, the third zirconia powder layer accounts for 10% to 14% by mass, the fourth zirconia powder layer accounts for 10% to 14% by mass, the fifth zirconia powder layer accounts for 10% to 14% by mass, the sixth zirconia powder layer accounts for 10% to 14% by mass, the seventh zirconia powder layer accounts for 10% to 14% by mass, and the eighth zirconia powder layer accounts for 13% to 17% by mass.

In some embodiments, the first zirconia powder layer accounts for 15% by mass, the second zirconia powder layer accounts for 10% by mass, the third zirconia powder layer accounts for 12% by mass, the fourth zirconia powder layer accounts for 12% by mass, the fifth zirconia powder layer accounts for 12% by mass, the sixth zirconia powder layer accounts for 12% by mass, the seventh zirconia powder layer accounts for 12% by mass, and the eighth zirconia powder layer accounts for 15% by mass.

In some embodiments, the first zirconia powder layer includes white powder 3 in a range of 70% to 93% by mass, yellow powder 3 in a range of 5% to 20% by mass, pink powder 3 in a range of 1% to 5% by mass, and gray powder 3 in a range of 1% to 5% by mass.

The second zirconia powder layer includes white powder 2 in a range of 1% to 10% by mass, the white powder 3 in a range of 10% to 70% by mass, the yellow powder 3 in a range of 5% to 25% by mass, the pink powder 3 in a range of 1% to 5% by mass, and the gray powder 3 in a range of 1% to 5% by mass.

The third zirconia powder layer includes the white powder 2 in a range of 15% to 35% by mass, the white powder 3 in a range of 25% to 73% by mass, the yellow powder 3 in a range of 10% to 30% by mass, the pink powder 3 in a range of 1% to 5% by mass, and the gray powder 3 in a range of 1% to 5% by mass.

The fourth zirconia powder layer includes the white powder 2 in a range of 1% to 48% by mass, the white powder 3 in a range of 10% to 55% by mass, yellow powder 2 in a range of 10% to 35% by mass, pink powder 2 in a range of 1% to 5% by mass, and gray powder 2 in a range of 1% to 5% by mass.

The fifth zirconia powder layer includes the white powder 2 in a range of 15% to 68% by mass, the white powder 3 in a range of 15% to 35% by mass, the yellow powder 2 in a range of 15% to 40% by mass, the pink powder 2 in a range of 1% to 5% by mass, and the gray powder 2 in a range of 1% to 5% by mass.

The sixth zirconia powder layer includes white powder 1 in a range of 1% to 46% by mass, the white powder 3 in a range of 37% to 45% by mass, yellow powder 1 in a range of 15% to 45% by mass, pink powder 1 in a range of 1% to 5% by mass, and gray powder 1 in a range of 1% to 5% by mass.

The seventh zirconia powder layer includes the white powder 1 in a range of 1 to 55% by mass, the white powder 2 in a range of 23 to 35% by mass, the yellow powder 1 in a range of 20 to 50% by mass, the pink powder 1 in a range of 1% to 5% by mass, and the gray powder 1 in a range of 1% to 5% by mass.

The eighth zirconia powder layer includes the white powder 1 in a range of 10% to 78% by mass, the yellow powder 1 in a range of 20% to 55% by mass, the pink powder 1 in a range of 1% to 5% by mass, and the gray powder 1 in a range of 1% to 5% by mass.

In some embodiments, the white powder 1 includes zirconia and hafnia in a combined range of 94% to 95% by mass, yttria in a range of 5% to 6% by mass, and alumina in a range of 0 to 0.5% by mass; the white powder 2 includes zirconia and hafnia in a combined range of 92% to 93% by mass, yttria in a range of 7% to 8% by mass, and alumina in a range of 0 to 0.5% by mass; and the white powder 3 includes zirconia and hafnia in a combined range of 90% to 91% by mass, yttria in a range of 9% to 10% by mass, and alumina in a range of 0 to 0.5% by mass.

In some embodiments, the yellow powder 1 includes zirconia and hafnia in a combined range of 93.8% to 94.8% by mass, yttria in a range of 5% to 6% by mass, and iron oxide in a range of 0.17% to 0.25% by mass; the yellow powder 2 includes zirconia and hafnia in a combined range of 92.6% to 93.6% by mass, yttria in a range of 7% to 8% by mass, and iron oxide in a range of 0.3% to 0.4% by mass; and the yellow powder 3 includes zirconia and hafnia in a combined range of 89.5% to 90.5% by mass, yttria in a range of 9% to 10% by mass, and iron oxide in a range of 0.5% to 0.6% by mass.

In some embodiments, the pink powder 1 includes zirconia and hafnia in a combined range of 83.5% to 85% by mass, yttria in a range of 5% to 6% by mass, and erbium oxide in a range of 9.6% to 10.6% by mass; the pink powder 2 includes zirconia and hafnia in a combined range of 79.5% to 81% by mass, yttria in a range of 7% to 8% by mass, and erbium oxide in a range of 11.6% to 12.6% by mass; and the pink powder 3 includes zirconia and hafnia in a combined range of 76.5% to 78% by mass, yttria in a range of 9% to 10% by mass, and erbium oxide in a range of 12.8% to 13.8% by mass.

In some embodiments, the gray powder 1 includes zirconia and hafnia in a combined range of 94% to 95% by mass, yttria in a range of 5% to 6% by mass, and manganese oxide in a range of 0.005% to 0.015% by mass; the gray powder 2 includes zirconia and hafnia in a combined range of 92% to 93% by mass, yttria in a range of 7% to 8% by mass, and manganese oxide in a range of 0.015% to 0.025% by mass; and the gray powder 3 includes zirconia and hafnia in a combined range of 90% to 91% by mass, yttria in a range of 9% to 10% by mass, and manganese oxide in a range of 0.025% to 0.035% by mass.

The present application further provides a preparation method for a multi-layer porcelain block, including:
  laying a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer sequentially;
  pre-pressing the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer to obtain a multi-layer porcelain block precursor;
  cold isostatic pressing the multi-layer porcelain block precursor; and
  sintering the multi-layer porcelain block precursor after cold isostatic pressing to obtain the multi-layer porcelain block.

In some embodiments, a pre-pressing pressure is 4 MPa to 6 MPa; a cold isostatic pressing pressure is 100 MPa to 300 MPa, with a holding time of 1 min to 15 min; and a sintering temperature is 1000° C., with a heating rate of 1° C./min.

The present application further provides a denture made from the aforementioned multi-layer porcelain block.

The multi-layer porcelain block of the present application are used for making dentures (porcelain teeth). With eight layers of zirconia powder layers, the multi-layer porcelain block significantly increase the average flexural strength of the dentures by adjusting the ratio and increasing the number of layers, which enables the fabrication of long bridges and half teeth while maintaining the translucency of the tooth incisal edge.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative work.

The accompanying FIGURE is a schematic flowchart of a preparation method for a multi-layer porcelain block according to some embodiments of the present application.

The realization of the purpose, functional characteristics and advantages of the present application will be further described with reference to the attached drawings in combination with embodiments.

DETAILED DESCRIPTION OF THE EMBODIMENTS

It should be noted that the terms, specific structures, and functional details are representative and used for explaining the specific embodiments. The present application can be implemented in various alternative forms and should not be limited solely to the embodiments described herein.

The following embodiments are detailed descriptions of the present application.

In some embodiments, the present application provides a multi-layer porcelain block, including a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer laid sequentially;
  the zirconia powder in the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer are doped with yttria; and
  the first zirconia powder layer accounts for 13% to 17% by mass, the second zirconia powder layer accounts for 8% to 12% by mass, the third zirconia powder layer accounts for 10% to 14% by mass, the fourth zirconia powder layer accounts for 10% to 14% by mass, the fifth zirconia powder layer accounts for 10% to 14% by mass, the sixth zirconia powder layer accounts for 10% to 14% by mass, the seventh zirconia powder layer accounts for 10% to 14% by mass, and the eighth zirconia powder layer accounts for 13% to 17% by mass.

The multi-layer porcelain block of the present application are used for making dentures (porcelain teeth). With eight layers of zirconia powder layers, the multi-layer porcelain block significantly increase the average flexural strength of the dentures by adjusting the ratio and increasing the number of layers, which enables the fabrication of long bridges and half teeth while maintaining the translucency of the tooth incisal edge.

In some embodiments, the main powder material in the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer is zirconia powder, which is doped with yttria. Different strength and transparency can be adjusted by adjusting the content of yttria. Specifically, higher yttria content results in higher translucency but lower strength.

In some embodiments, the first zirconia powder layer has a strength of 950 MPa. The second zirconia powder layer has a strength of 935 MPa. The third zirconia powder layer has a strength of 940 MPa. The fourth zirconia powder layer has a strength of 960 MPa. The fifth zirconia powder layer has a strength of 925 MPa. The sixth zirconia powder layer has a strength of 920 MPa. The seventh zirconia powder layer has a strength of 945 MPa. The eighth zirconia powder layer has a strength of 935 MPa.

In some embodiments, by mass percentage, the first zirconia powder layer accounts for 15%; the second zirconia powder layer accounts for 10%; the third zirconia powder layer accounts for 12%; the fourth zirconia powder layer accounts for 12%; the fifth zirconia powder layer accounts for 12%; the sixth zirconia powder layer accounts for 12%; the seventh zirconia powder layer accounts for 12%; the eighth zirconia powder layer accounts for 15%. In these embodiments, the ceramic teeth, which are cut from the multi-layer porcelain blocks, have appropriate incisal size and a natural transition of colors.

In some embodiments, the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer are formed by the combination and mixture of white powder 1, white powder 2, white powder 3, yellow powder 1, yellow powder 2, yellow powder 3, pink powder 1, pink powder 2, pink powder 3, gray powder 1, gray powder 2, and gray powder 3.

The white powder 1 has a transparency of 43% and a strength greater than 1200 MPa; the white powder 2 has a transparency of 49% and a strength greater than 950 MPa; the white powder 3 has a transparency of 57% and a strength greater than 700 MPa; the yellow powder 1 has a transparency of 43% and a strength greater than 1200 MPa; the yellow powder 2 has a transparency of 49% and a strength greater than 950 MPa; the yellow powder 3 has a transparency of 57% and a strength greater than 700 MPa; the pink powder 1 has a transparency of 43% and a strength greater than 1200 MPa; the pink powder 2 has a transparency of 49% and a strength greater than 950 MPa; the pink powder 3 has a transparency of 57% and a strength greater than 700 MPa; the gray powder 1 has a transparency of 43% and a strength greater than 1200 MPa; the gray powder 2 has a transparency of 49% and a strength greater than 950 MPa; and the gray powder 3 has a transparency of 57% and a strength greater than 700 MPa.

In some embodiments, the first zirconia powder layer includes white powder 3 in a range of 70% to 93% by mass, yellow powder 3 in a range of 5% to 20% by mass, pink powder 3 in a range of 1% to 5% by mass, and gray powder 3 in a range of 1% to 5% by mass; the second zirconia powder layer includes white powder 2 in a range of 1% to 10% by mass, white powder 3 in a range of 10% to 70% by mass, yellow powder 3 in a range of 5% to 25% by mass, pink powder 3 in a range of 1% to 5% by mass, and gray powder 3 in a range of 1% to 5% by mass; the third zirconia powder layer includes white powder 2 in a range of 15% to 35% by mass, white powder 3 in a range of 25% to 73% by mass, yellow powder 3 in a range of 10% to 30% by mass, pink powder 3 in a range of 1% to 5% by mass, and gray powder 3 in a range of 1% to 5% by mass; the fourth zirconia powder layer includes white powder 2 in a range of 1% to 48% by mass, white powder 3 in a range of 10% to 55% by mass, yellow powder 2 in a range of 10% to 35% by mass, pink powder 2 in a range of 1% to 5% by mass, and gray powder 2 in a range of 1% to 5% by mass; the fifth zirconia powder layer includes white powder 2 in a range of 15% to 68% by mass, white powder 3 in a range of 15% to 35% by mass, yellow powder 2 in a range of 15% to 40% by mass, pink powder 2 in a range of 1% to 5% by mass, and gray powder 2 in a range of 1% to 5% by mass; the sixth zirconia powder layer includes white powder 1 in a range of 1% to 46% by mass, white powder 3 in a range of 37% to 45% by mass, yellow powder 1 in a range of 15% to 45% by mass, pink powder 1 in a range of 1% to 5% by mass, and gray powder 1 in a range of 1% to 5% by mass; the seventh zirconia powder layer includes white powder 1 in a range of 1% to 55% by mass, white powder 2 in a range of 23% to 35% by mass, yellow powder 1 in a range of 20% to 50% by mass, pink powder 1 in a range of 1% to 5% by mass, and gray powder 1 in a range of 1% to 5% by mass; and the eighth zirconia powder layer includes white powder 1 in a range of 10% to 78% by mass, yellow powder 1 in a range of 20% to 55% by mass, pink powder 1 in a range of 1% to 5% by mass, and gray powder 1 in a range of 1% to 5% by mass. In this embodiment, the multi-layer porcelain block have appropriate translucency, and the eighth zirconia powder layer has suitable strength and better overall performance.

In some embodiments, the ratios for white powder 1, white powder 2, white powder 3, yellow powder 1, yellow powder 2, yellow powder 3, pink powder 1, pink powder 2, pink powder 3, gray powder 1, gray powder 2, and gray powder 3 are shown in the following Table 1.

TABLE 1

| compositions (wt %) | zirconia(doped with hafnia)($ZrO_2$ + $HfO_2$) | yttria($Y_2O_3$) | iron oxide($Fe_2O_3$) | erbium oxide($Er_2O_3$) | manganese oxide($Mn_2O_3$) | alumina ($Al_2O_3$) |
|---|---|---|---|---|---|---|
| white powder 1 | 94-95 | 5-6 | / | / | / | 0-0.5 |
| white powder 2 | 92-93 | 7-8 | / | / | / | 0-0.5 |
| white powder 3 | 90-91 | 9-10 | / | / | / | 0-0.5 |
| yellow powder 1 | 93.8-94.8 | 5-6 | 0.17-0.25 | / | / | / |
| yellow powder 2 | 92.6-93.6 | 7-8 | 0.3-0.4 | / | / | / |
| yellow powder 3 | 89.5-90.5 | 9-10 | 0.5-0.6 | / | / | / |
| pink powder 1 | 83.5-85 | 5-6 | / | 9.6-10.6 | / | / |
| pink powder 2 | 79.5-81 | 7-8 | / | 11.6-12.6 | / | / |
| pink powder 3 | 76.5-78 | 9-10 | / | 12.8-13.8 | / | / |
| gray powder 1 | 94-95 | 5-6 | / | / | 0.005-0.015 | / |
| gray powder 2 | 92-93 | 7-8 | / | / | 0.015-0.025 | / |
| gray powder 3 | 90-91 | 9-10 | / | / | 0.025-0.035 | / |

In some embodiments, as shown in the above Table 1, white powder 1 consists of zirconia and hafnia in a ratio of 94% to 95%, yttria 5% to 6%, and alumina 0 to 0.5%. White powder 2 consists of zirconia and hafnia in a ratio of 92% to 93%, yttria 7% to 8%, and alumina 0 to 0.5%. White powder 3 consists of zirconia and hafnia in a ratio of 90% to 91%, yttria 9% to 10%, and alumina 0 to 0.5%.

In some embodiments, as shown in the above Table 1, yellow powder 1 consists of zirconia and hafnia in a ratio of 93.8% to 94.8%, yttria 5% to 6%, and iron oxide 0.17% to 0.25%. Yellow powder 2 consists of zirconia and hafnia in a ratio of 92.6% to 93.6%, yttria 7% to 8%, and iron oxide 0.3% to 0.4%. Yellow powder 3 consists of zirconia and hafnia in a ratio of 89.5% to 90.5%, yttria 9% to 10%, and iron oxide 0.5% to 0.6%.

In some embodiments, as shown in the above Table 1, pink powder 1 consists of zirconia and hafnia in a ratio of 83.5% to 85%, yttria 5% to 6%, and erbium oxide 9.6% to 10.6%. Pink powder 2 consists of zirconia and hafnia in a ratio of 79.5% to 81%, yttria 7% to 8%, and erbium oxide 11.6% to 12.6%. Pink powder 3 consists of zirconia and hafnia in a ratio of 76.5% to 78%, yttria 9% to 10%, and erbium oxide 12.8% to 13.8%.

In some embodiments, as shown in the above Table 1, gray powder 1 consists of zirconia and hafnia in a ratio of 94% to 95%, yttria 5% to 6%, and manganese oxide 0.005% to 0.015%. Gray powder 2 consists of zirconia and hafnia in a ratio of 92% to 93%, yttria 7% to 8%, and manganese oxide 0.015% to 0.025%. Gray powder 3 consists of zirconia and hafnia in a ratio of 90% to 91%, yttria 9% to 10%, and manganese oxide 0.025% to 0.035%.

The present application further provides a method for preparing a multi-layer porcelain block, as shown in the accompanying FIGURE, the method including:

S100, laying a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer sequentially;

S200, pre-pressing the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer to obtain a multi-layer porcelain block precursor;

S300, cold isostatic pressing the multi-layer porcelain block precursor; and

S400, sintering the multi-layer porcelain block precursor after cold isostatic pressing to obtain the multi-layer porcelain block.

In some embodiments, the pre-pressing pressure is 4 MPa to 6 MPa; the cold isostatic pressing pressure is 100 MPa to 300 MPa, with a holding time of 1 min to 15 min; and the sintering temperature is 1000° C., with a heating rate of 1° C./min.

In some embodiments, prior to step S100, a three-dimensional motion mixer is used to blend the materials. The blending time ranges from 5 min to 60 min, thereby obtaining the zirconia powder for each layer. Step S200 as a pre-pressing operation involves dry pressing to preliminary mould each layer of the multi-layer porcelain block. After step S400, the multi-layer porcelain block undergoes external machining to facilitate the fitting and processing with dental carving equipment.

The present application further provides a denture made from the aforementioned multi-layer porcelain block.

The technical solution of the present application is described through specific embodiments below.

Embodiment 1

Dry Pressing: laying the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer sequentially; and applying a pressure of approximately 5 MPa for pre-pressing to obtain the multi-layer porcelain block precursor.

Cold Isostatic Pressing: performing cold isostatic pressing on the multi-layer porcelain block precursor with a pressure of 100 MPa to 300 MPa and a holding time of 1 min to 15 min.

Sintering: sintering the cold isostatically pressed multi-layer porcelain block precursor, and raising the temperature from room temperature to 1000° C. at a rate of 1° C./min, to obtain the multi-layer porcelain block.

In this embodiment, based on the mass ratio, the first zirconia powder layer is 10%, the second zirconia powder layer is 10%, the third zirconia powder layer is 13%, the fourth zirconia powder layer is 13%, the fifth zirconia powder layer is 13%, the sixth zirconia powder layer is 13%, the seventh zirconia powder layer is 13%, and the eighth zirconia powder layer is 15%.

Embodiment 2

Dry Pressing: laying the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer sequentially; and applying a pressure of approximately 5 MPa for pre-pressing to obtain the multi-layer porcelain block precursor.

Cold Isostatic Pressing: performing cold isostatic pressing on the multi-layer porcelain block precursor with a pressure of 100 MPa to 300 MPa and a holding time of 1 min to 15 min.

Sintering: sintering the cold isostatically pressed multi-layer porcelain block precursor, and raising the temperature from room temperature to 1000° C. at a rate of 1° C./min to obtain the multi-layer porcelain block.

In this embodiment, based on the mass ratio, the first zirconia powder layer is 15%, the second zirconia powder layer is 10%, the third zirconia powder layer is 12%, the fourth zirconia powder layer is 12%, the fifth zirconia powder layer is 12%, the sixth zirconia powder layer is 12%, the seventh zirconia powder layer is 12%, and the eighth zirconia powder layer is 15%.

Embodiment 3

Dry Pressing: laying the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer sequentially; and applying a pressure of approximately 5 MPa for pre-pressing to obtain the multi-layer porcelain block precursor.

Cold Isostatic Pressing: performing cold isostatic pressing on the multi-layer porcelain block precursor with a pressure of 100 MPa to 300 MPa and a holding time of 1 min to 15 minutes.

Sintering: sintering the cold isostatically pressed multi-layer porcelain block precursor, and raising the temperature from room temperature to 1000° C. at a rate of 1° C./min to obtain the multi-layer porcelain block.

In this embodiment, based on the mass ratio, the first zirconia powder layer is 15%, the second zirconia powder layer is 15%, the third zirconia powder layer is 11%, the fourth zirconia powder layer is 11%, the fifth zirconia powder layer is 11%, the sixth zirconia powder layer is 11%, the seventh zirconia powder layer is 11%, and the eighth zirconia powder layer is 15%.

The cutting edge and color gradient of the multi-layer porcelain blocks obtained in embodiments 1 to 3 are shown in Table 2.

TABLE 2

| layer ratio(%) | first zirconia powder layer | second zirconia powder layer | third zirconia powder layer | fourth zirconia powder layer | fifth zirconia powder layer | sixth zirconia powder layer | seventh zirconia powder layer | eighth zirconia powder layer | effect |
|---|---|---|---|---|---|---|---|---|---|
| embodiment 1 | 10 | 10 | 13 | 13 | 13 | 13 | 13 | 15 | small incisal end and non-obvious gradient |
| embodiment 2 | 15 | 10 | 12 | 12 | 12 | 12 | 12 | 15 | appropriate incisal end and natural gradient |
| embodiment 3 | 15 | 15 | 11 | 11 | 11 | 11 | 11 | 15 | large incisal end and fault |

In embodiments 1 to 3, the ceramic teeth cut from the multi-layer porcelain blocks produced in embodiment 2 have an appropriate cutting edge size and a natural color transition.

Embodiment 4

In embodiment 4, the proportion of each layer is consistent with that of embodiment 2. Based on embodiment 2, the specific composition ratios of each layer in embodiment 4 are shown in Table 3.

TABLE 3

| layer number | powder | weight ratio of powder (wt %) | thickness ratio of each layer (%) |
|---|---|---|---|
| first zirconia powder layer | white powder 1 | 0 | 15 |
| | white powder 2 | 5-10 | |
| | white powder 3 | 60-88 | |
| | yellow powder 3 | 5-20 | |
| | pink powder 3 | 1-5 | |
| | gray powder 3 | 1-5 | |
| second zirconia powder layer | white powder 1 | 0 | 10 |
| | white powder 2 | 6-15 | |
| | white powder 3 | 5-65 | |
| | yellow powder 3 | 5-25 | |
| | pink powder 3 | 1-5 | |
| | gray powder 3 | 1-5 | |
| third zirconia powder layer | white powder 1 | 0 | 12 |
| | white powder 2 | 20-40 | |
| | white powder 3 | 20-68 | |
| | yellow powder 3 | 10-30 | |
| | pink powder 3 | 1-5 | |
| | gray powder 3 | 1-5 | |
| fourth zirconia powder layer | white powder 1 | 0 | 12 |
| | white powder 2 | 6-53 | |
| | white powder 3 | 5-50 | |
| | yellow powder 2 | 10-35 | |
| | pink powder 2 | 1-5 | |
| | gray powder 2 | 1-5 | |
| fifth zirconia powder layer | white powder 1 | 0 | 12 |
| | white powder 2 | 20-73 | |
| | white powder 3 | 10-30 | |
| | yellow powder 2 | 15-40 | |
| | pink powder 2 | 1-5 | |
| | gray powder2 | 1-5 | |
| sixth zirconia powder layer | white powder 1 | 6-51 | 12 |
| | white powder 2 | 0 | |
| | white powder 3 | 32-40 | |
| | yellow powder 1 | 15-45 | |
| | pink powder 1 | 1-5 | |
| | gray powder 1 | 1-5 | |
| seventh zirconia powder layer | white powder 1 | 6-60 | 12 |
| | white powder 2 | 18-30 | |
| | white powder 3 | 0 | |
| | yellow powder 1 | 20-50 | |
| | pink powder 1 | 1-5 | |
| | gray powder 1 | 1-5 | |
| eighth zirconia powder layer | white powder 1 | 10-78 | 15 |
| | white powder 2 | 0 | |
| | white powder 3 | 0 | |
| | yellow powder 1 | 20-55 | |
| | pink powder 1 | 1-5 | |
| | gray powder 1 | 1-5 | |

Embodiment 5

In embodiment 5, the proportion of each layer is consistent with that of embodiment 2. Based on embodiment 5, the specific composition ratios of each layer in embodiment 5 are shown in the following Table 4.

TABLE 4

| Layer number | powder | weight ratio of powder (wt %) | thickness ratio of each layer (%) |
|---|---|---|---|
| first zirconia powder layer | white powder 1 | 0 | 15 |
| | white powder 2 | 0 | |
| | white powder 3 | 70-93 | |
| | yellow powder 3 | 5-20 | |
| | pink powder 3 | 1-5 | |
| | gray powder 3 | 1-5 | |
| second zirconia powder layer | white powder 1 | 0 | 10 |
| | white powder 2 | 1-10 | |
| | white powder 3 | 10-70 | |
| | yellow powder 3 | 5-25 | |
| | pink powder 3 | 1-5 | |
| | gray powder 3 | 1-5 | |
| third zirconia powder layer | white powder 1 | 0 | 12 |
| | white powder 2 | 15-35 | |
| | white powder 3 | 25-73 | |
| | yellow powder 3 | 10-30 | |
| | pink powder 3 | 1-5 | |
| | gray powder 3 | 1-5 | |
| fourth zirconia powder layer | white powder 1 | 0 | 12 |
| | white powder 2 | 1-48 | |
| | white powder 3 | 10-55 | |
| | yellow powder 2 | 10-35 | |
| | pink powder 2 | 1-5 | |
| | gray powder 2 | 1-5 | |
| fifth zirconia powder layer | white powder 1 | 0 | 12 |
| | white powder 2 | 15-68 | |
| | white powder 3 | 15-35 | |
| | yellow powder 2 | 15-40 | |
| | pink powder 2 | 1-5 | |
| | gray powder 2 | 1-5 | |
| sixth zirconia powder layer | white powder 1 | 1-46 | 12 |
| | white powder 2 | 0 | |
| | white powder 3 | 37-45 | |
| | yellow powder 1 | 15-45 | |
| | pink powder 1 | 1-5 | |
| | gray powder 1 | 1-5 | |
| seventh zirconia powder layer | white powder 1 | 1-55 | 12 |
| | white powder 2 | 23-35 | |
| | white powder 3 | 0 | |
| | yellow powder 1 | 20-50 | |
| | pink powder 1 | 1-5 | |
| | gray powder 1 | 1-5 | |
| eighth zirconia powder layer | white powder 1 | 10-78 | 15 |
| | white powder 2 | 0 | |
| | white powder 3 | 0 | |
| | yellow powder 1 | 20-55 | |
| | pink powder 1 | 1-5 | |
| | gray powder 1 | 1-5 | |

Embodiment 6

In embodiment 6, the proportion of each layer is consistent with that of embodiment 2. Based on embodiment 6, the specific composition ratios of each layer in embodiment 6 are shown in the following Table 5.

TABLE 5

| layer number | powder | weight ratio of powder (wt %) | thickness ratio of each layer (%) |
|---|---|---|---|
| first zirconia powder layer | white powder 1 | 0 | 15 |
| | white powder 2 | 0 | |
| | white powder 3 | 70-93 | |
| | yellow powder 3 | 5-20 | |
| | pink powder 3 | 1-5 | |
| | gray powder 3 | 1-5 | |
| second zirconia powder layer | white powder 1 | 0 | 10 |
| | white powder 2 | 1-5 | |
| | white powder 3 | 15-75 | |
| | yellow powder 3 | 5-25 | |
| | pink powder 3 | 1-5 | |
| | gray powder 3 | 1-5 | |
| third zirconia powder layer | white powder 1 | 0 | 12 |
| | white powder 2 | 10-30 | |
| | white powder 3 | 30-78 | |
| | yellow powder 3 | 10-30 | |
| | pink powder 3 | 1-5 | |
| | gray powder 3 | 1-5 | |
| fourth zirconia powder layer | white powder 1 | 0 | 12 |
| | white powder 2 | 1-43 | |
| | white powder 3 | 15-60 | |
| | yellow powder 2 | 10-35 | |
| | pink powder 2 | 1-5 | |
| | gray powder 2 | 1-5 | |
| fifth zirconia powder layer | white powder 1 | 0 | 12 |
| | white powder 2 | 10-63 | |
| | white powder 3 | 20-40 | |
| | yellow powder 2 | 15-40 | |
| | pink powder 2 | 1-5 | |
| | gray powder 2 | 1-5 | |
| sixth zirconia powder layer | white powder 1 | 1-41 | 12 |
| | white powder 2 | 0 | |
| | white powder 3 | 42-50 | |
| | yellow powder 1 | 15-45 | |
| | pink powder 1 | 1-5 | |
| | gray powder 1 | 1-5 | |

TABLE 5-continued

| layer number | powder | weight ratio of powder (wt %) | thickness ratio of each layer (%) |
|---|---|---|---|
| seventh zirconia powder layer | white powder 1 | 1-50 | 12 |
| | white powder 2 | 28-40 | |
| | white powder 3 | 0 | |
| | yellow powder 1 | 20-50 | |
| | pink powder 1 | 1-5 | |
| | gray powder 1 | 1-5 | |
| eighth zirconia powder layer | white powder 1 | 1-73 | 15 |
| | white powder 2 | 5-10 | |
| | white powder 3 | 0 | |
| | yellow powder 1 | 20-55 | |
| | pink powder 1 | 1-5 | |
| | gray powder 1 | 1-5 | |

The transmittance and strength of the multi-layer porcelain block produced in embodiments 4 to 6 are shown in the following Table 6.

TABLE 6

| item | | first zirconia powder layer | second zirconia powder layer | third zirconia powder layer | fourth zirconia powder layer | fifth zirconia powder layer | sixth zirconia powder layer | seventh zirconia powder layer | eighth zirconia powder layer |
|---|---|---|---|---|---|---|---|---|---|
| emobodiment 4 | strength (MPa) | 727 | 773 | 853 | 916 | 986 | 1061 | 1139 | 1219 |
| | transmittance (%) | 55 | 54 | 52 | 50 | 48 | 46 | 44 | 43 |
| emobodiment 5 | strength (MPa) | 713 | 755 | 832 | 901 | 969 | 1042 | 1114 | 1212 |
| | transmittance (%) | 57 | 56 | 54 | 52 | 50 | 48 | 46 | 43 |
| emobodiment 6 | strength (MPa) | 710 | 739 | 814 | 875 | 945 | 1022 | 1096 | 1181 |
| | transmittance (%) | 57 | 56 | 55 | 53 | 52 | 50 | 48 | 46 |

In comparison between the aforementioned embodiments 4 and 5, the strength of the neck (eighth layer) is similar, but embodiment 5 exhibits better overall translucency. Comparing embodiments 5 and 6, the translucency of the cutting edge (first layer) is similar, but embodiment 5 demonstrates stronger overall strength. Therefore, embodiment 5 exhibits the best overall performance. The average flexural strength of embodiment 5 is greater than 900 MPa, significantly surpassing most multi-layer ceramic block products on the market (with a strength of approximately 720 MPa), and meeting the requirements for long bridges and half teeth (greater than 800 MPa).

It should be noted that the specific steps mentioned in these embodiments are not intended to be limited to a particular order unless otherwise specified, as long as the implementation of the present application is not affected. The steps described earlier may be performed in any order, even simultaneously. All variations that can implement the present application are considered within the scope of protection.

The above content is a further detailed description of the present application in conjunction with specific optional embodiments, and it cannot be assumed that the specific implementation of the present application is limited to these descriptions. For those of ordinary skill in the technical art of the present application, without departing from the concept of the present application, some simple deduction or replacement can be made, which should be regarded as belonging to the protection scope of the present application.

What is claimed is:

1. A multi-layer porcelain block, comprising a first zirconia powder layer, a second zirconia powder layer, a third zirconia powder layer, a fourth zirconia powder layer, a fifth zirconia powder layer, a sixth zirconia powder layer, a seventh zirconia powder layer, and an eighth zirconia powder layer laid in sequence,
wherein the zirconia powders in the first zirconia powder layer, the second zirconia powder layer, the third zirconia powder layer, the fourth zirconia powder layer, the fifth zirconia powder layer, the sixth zirconia powder layer, the seventh zirconia powder layer, and the eighth zirconia powder layer are doped with yttria; and
wherein the first zirconia powder layer accounts for 15% by mass, the second zirconia powder layer accounts for 10% by mass, the third zirconia powder layer accounts for 12% by mass, the fourth zirconia powder layer accounts for 12% by mass, the fifth zirconia powder layer accounts for 12% by mass, the sixth zirconia powder layer accounts for 12% by mass, the seventh zirconia powder layer accounts for 12% by mass, and the eighth zirconia powder layer accounts for 15% by mass;
wherein the first zirconia powder layer comprises white powder 3 in a range of 70% to 93% by mass, yellow powder 3 in a range of 5% to 20% by mass, pink powder 3 in a range of 1% to 5% by mass, and gray powder 3 in a range of 1% to 5% by mass;
the second zirconia powder layer comprises white powder 2 in a range of 1% to 10% by mass, the white powder 3 in a range of 10% to 70% by mass, the yellow powder 3 in a range of 5% to 25% by mass, the pink powder 3 in a range of 1% to 5% by mass, and the gray powder 3 in a range of 1% to 5% by mass;
the third zirconia powder layer comprises the white powder 2 in a range of 15% to 35% by mass, the white powder 3 in a range of 25% to 73% by mass, the yellow powder 3 in a range of 10% to 30% by mass, the pink powder 3 in a range of 1% to 5% by mass, and the gray powder 3 in a range of 1% to 5% by mass;
the fourth zirconia powder layer comprises the white powder 2 in a range of 1% to 48% by mass, the white powder 3 in a range of 10% to 55% by mass, yellow powder 2 in a range of 10% to 35% by mass, pink powder 2 in a range of 1% to 5% by mass, and gray powder 2 in a range of 1% to 5% by mass;
the fifth zirconia powder layer comprises the white powder 2 in a range of 15% to 68% by mass, the white powder 3 in a range of 15% to 35% by mass, the yellow powder 2 in a range of 15% to 40% by mass, the pink powder 2 in a range of 1% to 5% by mass, and the gray powder 2 in a range of 1% to 5% by mass;

the sixth zirconia powder layer comprises white powder 1 in a range of 1% to 46% by mass, the white powder 3 in a range of 37% to 45% by mass, yellow powder 1 in a range of 15% to 45% by mass, pink powder 1 in a range of 1% to 5% by mass, and gray powder 1 in a range of 1% to 5% by mass;

the seventh zirconia powder layer comprises the white powder 1 in a range of 1 to 55% by mass, the white powder 2 in a range of 23 to 35% by mass, the yellow powder 1 in a range of 20 to 50% by mass, the pink powder 1 in a range of 1% to 5% by mass, and the gray powder 1 in a range of 1% to 5% by mass; and the eighth zirconia powder layer comprises the white powder 1 in a range of 10% to 78% by mass, the yellow powder 1 in a range of 20% to 55% by mass, the pink powder 1 in a range of 1% to 5% by mass, and the gray powder 1 in a range of 1% to 5% by mass;

wherein the white powder 1 comprises zirconia and hafnia in a combined range of 94% to 95% by mass, yttria in a range of 5% to 6% by mass, and alumina in a range of 0 to 0.5% by mass; the white powder 2 comprises zirconia and hafnia in a combined range of 92% to 93% by mass, yttria in a range of 7% to 8% by mass, and alumina in a range of 0 to 0.5% by mass; and the white powder 3 comprises zirconia and hafnia in a combined range of 90% to 91% by mass, yttria in a range of 9% to 10% by mass, and alumina in a range of 0 to 0.5% by mass;

wherein the yellow powder 1 comprises zirconia and hafnia in a combined range of 93.8% to 94.8% by mass, yttria in a range of 5% to 6% by mass, and iron oxide in a range of 0.17% to 0.25% by mass; the yellow powder 2 comprises zirconia and hafnia in a combined range of 92.6% to 93.6% by mass, yttria in a range of 7% to 8% by mass, and iron oxide in a range of 0.3% to 0.4% by mass; and the yellow powder 3 comprises zirconia and hafnia in a combined range of 89.5% to 90.5% by mass, yttria in a range of 9% to 10% by mass, and iron oxide in a range of 0.5% to 0.6% by mass;

wherein the pink powder 1 comprises zirconia and hafnia in a combined range of 83.5% to 85% by mass, yttria in a range of 5% to 6% by mass, and erbium oxide in a range of 9.6% to 10.6% by mass; the pink powder 2 comprises zirconia and hafnia in a combined range of 79.5% to 81% by mass, yttria in a range of 7% to 8% by mass, and erbium oxide in a range of 11.6% to 12.6% by mass; and the pink powder 3 comprises zirconia and hafnia in a combined range of 76.5% to 78% by mass, yttria in a range of 9% to 10% by mass, and erbium oxide in a range of 12.8% to 13.8% by mass;

wherein the gray powder 1 comprises zirconia and hafnia in a combined range of 94% to 95% by mass, yttria in a range of 5% to 6% by mass, and manganese oxide in a range of 0.005% to 0.015% by mass; the gray powder 2 comprises zirconia and hafnia in a combined range of 92% to 93% by mass, yttria in a range of 7% to 8% by mass, and manganese oxide in a range of 0.015% to 0.025% by mass; and the gray powder 3 comprises zirconia and hafnia in a combined range of 90% to 91% by mass, yttria in a range of 9% to 10% by mass, and manganese oxide in a range of 0.025% to 0.035% by mass.

2. A denture, made from the multi-layer porcelain block according to claim 1.

\* \* \* \* \*